Figure 1:
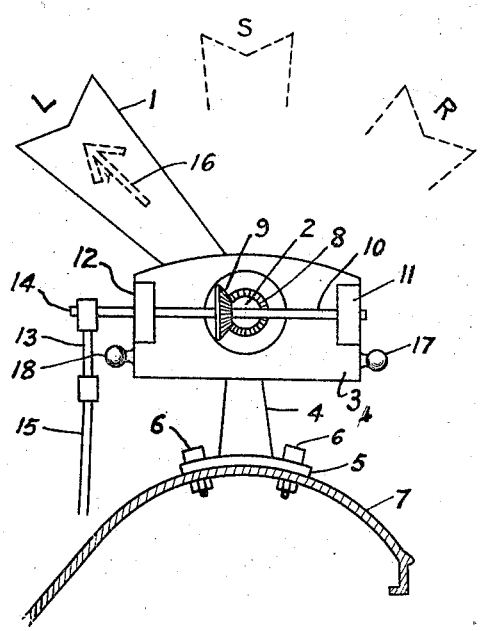

March 22, 1927.  1,621,597

R. K. PERSHAD

DIRECTION INDICATOR

Filed Dec. 2, 1924

Inventor
Raja Karan Pershad
per Rowaters
Attorney.

Patented Mar. 22, 1927.

1,621,597

UNITED STATES PATENT OFFICE.

RAJA KARAN PERSHAD, OF HYDERABAD, DECCAN, INDIA.

DIRECTION INDICATOR.

Application filed December 2, 1924, Serial No. 753,490, and in British India September 23, 1924.

This invention relates to direction signalling means for motor cars and like vehicles.

Its object is to prevent some of the many accidents which occur in large cities due to the daily increasing motor traffic.

At present, the driver of a car has to stretch out his hand when he comes to cross road to indicate the side to which his car is about to turn.

By means of the auto-car signal, which forms the subject matter of this invention, a slight pressure on a conveniently placed lever will place the signal arm in the required position thus saving the driver the trouble of stretching out his hand, and leaving him free to use both his hands on the steering wheel.

When an accident occurs, the motorist naturally withdraws his hand, but according to this invention the signal remains in the same position thus affording clear evidence that the proper direction was indicated.

The auto-car signal is fixed in a convenient position so as to be visible both from the front and the rear of the car.

The use of the signal will bring about the introduction of a uniform system of regulation; at present the rules differ from place to place thus causing a good deal of confusion, and this can be removed only by adopting a common set of rules.

The device is quite simple and easy to operate and it is believed, that by its use, a large number of accidents will be prevented.

The mechanism may be of very simple character so that there are scarcely any parts to get out of order, which cannot be repaired at once. The connecting lever is fixed near the steering wheel and is within convenient reach of the driver's hand.

A small electric lamp may be attached to the signal so that the indication of the arm may be visible at night.

The device thus forms a decided improvement over the present method, as the hand of the driver even if stretched out in the night will be practically invisible in the dark.

The signal arm may conveniently be painted in a brighter colour than that of the body of the car, so that it may be conspicuously visible at all times.

The device being merely a mechanical contrivance it is held that it will give more prompt and effective service than a similar one worked by electricity or some other means.

Care is taken to give the signal a smart finish and its position on the mudguard gives it the appearance of a mascot.

The skeleton sector may be lined with plush in order to avoid the slightest noise due to the vibration when the car is in motion.

The apparatus will peferably be constructed to be as light as possible; and the parts may for this purpose be made of steel and aluminium which give them the necessary rigidity without making them too weighty.

An occasional lubrication of the grooved wheels is enough to keep them in working condition.
It is a mater of experience that the driver in practice very often does not stretch his hand out before making a turn, and many accidents have happened owing to this omission. The apparatus here described is so easy to operate that the driver will try, on every occasion, to make use of it; he will always take it as a pleasure to move the lever to the correct side while the car is running.

When the car is turning to the right, there are no convenient means of indicating the direction by stretching the hand out if the driver is alone in the car. With apparatus according to this invention this can be easily accomplished by turning the arm through say 70° to the right.

The driver on many occasions finds it inconvenient to steer with one hand and to stretch out his other hand for indicating the direction while taking a turn. It has also been noticed that at such times he shows his hands for a moment only and then resumes the use of both the hands for steering the wheel. It very often happens, that when there is no policeman on the spot, the driver takes the turning without making any sign whatever; simply because he finds it inconvenient to steer with one hand. The introduction of this new device will it is believed put an end to all these and similar troubles and thus prevent a large number of accidents on the road.

The invention comprises apparatus for indicating the direction a motor car or other vehicle is about to turn, consisting of an indicating arm mounted in a conspicuous position to one side of the vehicle, but preferably upon the front mud-guard, and adapted to be operated by a lever or equivalent fixed to the steering pillar of the car, or in other convenient position adjacent to the steering wheel, characterized by the indicator arm having three fixed positions to indicate turning to the right, keeping straight on or turning to the left, with or without a fourth fixed position intermediate between the last two to indicate slowing down.

The indicating arm may have mounted on it or operating in conjunction therewith an electric light adapted to give a visual signal at night.

The apparatus may according to this invention have a hollow indicating arm with a light fixed therein, with arrow or other distinctively shaped window or windows adapted to be lighted up at night by said light, said indication preferably being visible both from the front and the back.

The invention will now be described with reference to the accompanying drawings which are only given however as an indication of one manner in which the more important parts of the indicating device may be constructed.

Figure 2:
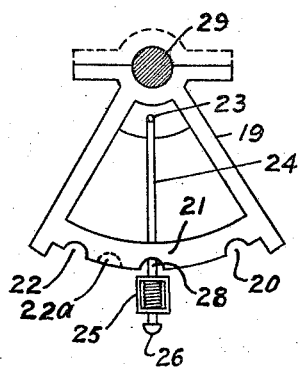

In these drawings Figure 1, is a view of one shape the indicator arm may take, and Figure 2 is a view of a control lever and sector adapted to be clamped, for example, to the steering pillar of a car under the steering wheel.

In these drawings the indicating arm 1, may have a normal position, S pointing straight upwards to indicate the car is travelling straight forward, and two other fixed temporary positions to the right as shown at R or to the left as shown at L, to indicate the car driver's intention is to turn to the right or left respectively.

The indicating arm 1, may swing through any convenient arc of a circle to these positions.

An intermediate position, for example midway between S and L, may or may not be introduced to indicate slowing down.

The arm 1 is secured to a shaft 2, which is journaled in a stand 3. This stand is preferably of ornamental design, and is mounted on a support 4 and a base 5. The base may be fixed in any convenient position on the car.

The preferable position is to fix it on the front mud-guard as indicated in Figure 1, wherein the base 5 is secured by bolts 6, 6 to the mud-guard 7.

To operate the indicator arm 1, the pivot shaft 2, has a bevel gear 8 fixed thereto, which is rotated by a bevel gear transverse 9 carried on a shaft 10. This shaft is mounted in bearings 11 and 12. A crank 13 is fitted to the squared end 14 of this shaft and is operated by a connecting rod 15 from the control sector on the steering pillar.

To indicate the direction of travel at night the indicator arm 1, may be made hollow and have a slit or window made therein with an electric bulb inside to light up the window. Preferably the window or slit will show both to the front and the back. Preferably also the said window or slit may be made in the shape of an arrow, as shown dotted at 16 on the indicator arm 1, in order to indicate clearly the direction to be taken.

Alternatively, two lamps 17 and 18 may be so arranged that the movement of the indicator arm 1 will place one or other of the said lamps in circuit.

The indicating arm 1 may be worked from a control sector 19 fixed, for example, to the steering pillar 29. The sector may have three fixed position notches 20, 21, 22 therein corresponding to the three main working positions R, S or L of the indicator arm.

A fourth notch 22ª may be provided to indicate slowing down, if desired.

The rod 23 by which indicator arm 1 is actuated operates the same by rotation. This rod 23 is fixed in suitable bearings and is rotated by moving the cranked end or lever 24.

The cranked end or lever 24 carries a catch box 25 having a catch knob 26 operated by a spring 27 which normally holds the catch 28 in one or other of the three notches 20, 21 or 22.

Suitable transmission cranks and rods may connect the parts 23 and 15. These need no description. If preferred a Bowden wire may be introduced for this purpose, or any convenient means may be used for connecting the control lever 24 to the indicator arm 1.

It will of course be understood that the invention is not restricted to the embodiments described and illustrated, but that reasonable modifications come within the scope of the same. For example, the indicator might be fixed to the side of the car instead of on the mud-guard. The exact shape is immaterial and the provision of a neat, artistic device, for example representing a female figure, may exercise the ingenuity of the manufacturer. A red light may be shown when the car is turning to the left (which is the dangerous turn across the line of traffic) and a green light when it is about to turn to the right (a comparative safe turn). Both a turning to the left or a slowing down of the speed of the car might be indicated by the signal to the left.

The slowing down might be indicated by an intermediate position between straight ahead and turn to left.

The light indication for night work, which light may be either electric or acetylene or other light, may be worked in any convenient manner. In the other hand it is quite possible to indicate slowing down by a conventional movement of the indicator arm for example by moving the arm to and fro and then bringing it back to its vertical position.

It is known with heavy motor lorries and with motor buses of large size to use an indicating arm which can be projected outwards from the side of the vehicle when it is intended to turn to the side. This known device gives only one indication, whereas according to this invention an indication may be given by using an arm having three or more positions to give much more information than has hitherto been conveyed.

Having now particularly described and ascertained the nature of my said invention and in what manner the same is to be performed, I declare that what I claim is:—

An indicating device for an automobile, comprising a base adapted to the mounting on the front fender of the automobile, a support on said base, a stand mounted upon the upper end of said support, a shaft journaled in said stand, an indicating arm on one end of said shaft adapted to swing to the right and to the left to indicate the direction in which the automobile is about to turn, a bevel gear on the opposite end of said shaft, a second shaft extending transversely of said fender and at right angles to the shaft carrying the indicating arm, a second bevel gear located centrally of said second shaft for engagement with said first mentioned bevel gear, bearings on said stand for rotatably supporting said second shaft, the said second shaft projecting beyond one of said bearings and the stand, a crank arm mounted upon the projecting end of said shaft, and actuating means connected to said crank arm to move the indicating arm into the desired position, the said actuating means being located adjacent to the steering shaft of the automobile.

In testimony whereof I hereto affix my signature this 31st day of October, 1924.

RAJA KARAN PERSHAD.